(12) United States Patent
Lee et al.

(10) Patent No.: US 10,808,048 B2
(45) Date of Patent: Oct. 20, 2020

(54) PROCESS OF MANUFACTURE OF CATALYST AND PROPYLENE POLYMER THAT USE THIS OR COPOLYMER FOR PROPYLENE POLYMERIZATION

(71) Applicant: Hanwha Total Petrochemical Co., Ltd., Seosan-si (KR)

(72) Inventors: Young Joo Lee, Seosan-si (KR); Su Min Ko, Seosan-si (KR); Joon Ryeo Park, Seosan-si (KR); Eun-Il Kim, Seosan-si (KR)

(73) Assignee: HANWHA TOTAL PETROCHEMICAL CO., LTD., Seonsan-si (KR)

( * ) Notice: Subject to any disclaimer, the term of this patent is extended or adjusted under 35 U.S.C. 154(b) by 297 days.

(21) Appl. No.: 15/832,352

(22) Filed: Dec. 5, 2017

(65) Prior Publication Data
US 2018/0155461 A1 Jun. 7, 2018

(30) Foreign Application Priority Data
Dec. 5, 2016 (KR) .................. 10-2016-0164086

(51) Int. Cl.
| | | |
|---|---|---|
| *C08F 4/649* | (2006.01) | |
| *C08F 10/06* | (2006.01) | |
| *C08F 2/38* | (2006.01) | |
| *C08F 4/643* | (2006.01) | |

(52) U.S. Cl.
CPC ............. *C08F 4/6494* (2013.01); *C08F 2/38* (2013.01); *C08F 4/6435* (2013.01); *C08F 10/06* (2013.01); *C08F 2800/20* (2013.01)

(58) Field of Classification Search
None
See application file for complete search history.

(56) References Cited

U.S. PATENT DOCUMENTS

| | | |
|---|---|---|
| 4,562,173 A | 12/1985 | Terano et al. |
| 4,981,930 A | 1/1991 | Funabashi et al. |
| 6,693,161 B2 | 2/2004 | Collina et al. |
| 9,751,965 B2 | 9/2017 | Yu et al. |
| 2011/0040051 A1 | 2/2011 | Xie et al. |

FOREIGN PATENT DOCUMENTS

| | | |
|---|---|---|
| EP | 0341723 B1 | 10/1991 |
| KR | 100572616 B1 | 4/2006 |

*Primary Examiner* — Yun Qian
(74) *Attorney, Agent, or Firm* — Harness, Dickey & Pierce, P.L.C.

(57) ABSTRACT

The present disclosure relates to a solid catalyst for propylene polymerization and a process for manufacture of a propylene polymer or copolymer using the solid catalyst, and provides a solid catalyst including carriers produced via a reaction between dialkoxy magnesium and metal halide, titanium halide, an organic electron donor, etc. and a process of manufacture of a propylene-based block copolymer via copolymerization of propylene-α-olefin using the solid catalyst. Particularly, internal electron donors including an ester group and an alkoxy group are used as two kinds of organic electron donors used in the present disclosure, and, thus, a block copolymer having high activity and excellent stereoregularity and a high rubber content via copolymerization with α-olefin can be produced using a solid catalyst system suggested in the present disclosure.

8 Claims, No Drawings

PROCESS OF MANUFACTURE OF CATALYST AND PROPYLENE POLYMER THAT USE THIS OR COPOLYMER FOR PROPYLENE POLYMERIZATION

CROSS-REFERENCE TO RELATED APPLICATION

This application claims the benefit and priority of Korean Patent Application No. 10-2016-0164086 filed Dec. 5, 2016. The entire disclosure of the above application is incorporated herein by reference.

FIELD

The present disclosure relates to a solid catalyst including carriers produced via a reaction between dialkoxy magnesium and metal halide, titanium halide, an organic electron donor, etc. and a process of manufacture of polypropylene using the same. If a propylene polymer is manufactured using a Ziegler-Natta catalyst including such a solid catalyst system, a propylene resin having high activity, excellent stereoregularity, and high hydrogen reactivity can be produced and a block copolymer having a high rubber content can also be produced via copolymerization with α-olefin.

BACKGROUND

This section provides background information related to the present disclosure which is not necessarily prior art.

Polypropylene is being used widely in real life or industry as a very useful material, particularly for household items such as food containers, and automobiles and electronic goods. For the performance of various polypropylene products, it is important to improve the stiffness using high crystallinity. Meanwhile, the impact resistance required for materials for the interior and exterior of automobiles can be satisfied by producing a propylene-based block copolymer having a high rubber content. To this end, the role of a polymerization catalyst is much needed. That is, in order to improve the stereoregularity of a produced polymer and satisfy a high degree of copolymerization with α-olefin, it is necessary to design a catalyst system. Further, for economic feasibility in the production of polymers, a higher polymerization activity of a catalyst is more effective.

Meanwhile, in general, a catalyst system used for gas-phase polymerization, slurry polymerization, and bulk polymerization of propylene includes a Ziegler-Natta-based catalyst component, alkyl aluminum, and an external electron donor. Particularly, such a catalyst component has been known as a solid catalyst including magnesium, titanium, an internal electron donor, and halogen as essential elements. Particularly, the internal electron donor has been known as having considerable effects on the activity and stereoregularity of the catalyst depending on a molecular structure. In order to lower the production cost by increasing the catalytic activity and improve the properties of polymers by improving the catalytic performance such as stereoregularity, it is generally known in this field of art to use diester of aromatic dicarboxylic acid as an internal electron donor. In this regard, various patent applications have been filed. Examples thereof may include U.S. Pat. Nos. 4,562,173, 4,981,930, and Korean Patent No. 0072844. These patents suggest a method for preparing a catalyst showing high activity and stereoregularity by using aromatic dialkyldiesters or aromatic monoalkylmonoesters.

The methods according to the above-mentioned patents are not sufficient to obtain high stereoregular polymers with a high yield and thus further improvements in the methods are required.

Korean Patent No 0491387 discloses a method for preparing a catalyst using a non-aromatic diether as an internal electron donor and Korean Patent No. 0572616 discloses a method for preparing a catalyst using a non-aromatic compound including both ketone and ether functional groups as an internal electron donor. However, both of these methods are needed to be significantly improved in terms of the activity and stereoregularity.

Also, U.S. Patent Laid-open Publication No. 2011/0040051 discloses a method for preparing a catalyst using a mixture of diethyl 2,3-diisopropyl-2-cyanosuccinate and 9,9-bismethoxy fluorene as an internal electron donor. However, the prepared catalyst is very inferior in terms of both the activity and stereoregularity. Thus, further improvements in the method are required.

SUMMARY

This section provides a general summary of the disclosure, and is not a comprehensive disclosure of its full scope or all of its features.

The present disclosure is to solve the problems of the prior art as described above, and the present disclosure has been made in an effort to provide a solid catalyst that enables the production of a propylene resin having high stereoregularity and activity, the production of a propylene resin having excellent hydrogen activity, and the production of a block copolymer having a high rubber content via copolymerization with α-olefin and a process of manufacture of a propylene copolymer using the same.

A method for preparing a solid catalyst for propylene polymerization according to the present disclosure includes the following steps:

(1) reacting diethoxy magnesium with a metal halide compound in the presence of an organic solvent at a relatively low temperature;

(2) reacting two kinds of internal electron donors while increasing the temperature after the reaction of diethoxy magnesium;

(3) keeping the reaction at a high temperature for a predetermined period of time; and (4) secondarily reacting the product obtained from the step (3) with a metal halide compound at a high temperature and then washing the resultant product.

In the above-described method for preparing a solid catalyst, diethoxy magnesium used in the step (1) which is obtained by reacting metal magnesium with an alcohol anhydride in the presence of magnesium chloride is spherical particles having an average particle diameter of 10 to 200 µm with a smooth surface, and the spherical particle shape preferably remains as it is even during propylene polymerization. When the average particle diameter is less than 10 µm, an increased amount of microparticles are present in the produced catalysts, which is not preferable. When it is more than 200 µm, the apparent density is decreased and it is difficult to obtain a uniform particle shape when preparing a catalyst, which is not preferable.

The organic solvent used in the step (1) is not particularly limited. Preferably, aliphatic hydrocarbon, aromatic hydrocarbon, and halogenated hydrocarbon having 6 to 12 carbon atoms may be used. More preferably, saturated aliphatic hydrocarbon, aromatic hydrocarbon or halogenated hydrocarbon having 7 to 10 carbon atoms may be used. For example, at least one selected from the group consisting of heptane, octane, nonane, decane, toluene, xylene, chlorohexane, chloroheptane or the like may be used as a mixture.

The ratio of use of the organic solvent to diethoxy magnesium, i.e. diethoxy magnesium weight:organic solvent volume is preferably 1:5 to 50, more preferably 1:7 to 20. When the ratio of use is less than 1:5, the viscosity of slurry becomes rapidly increased thereby hindering homogeneous stirring, which is not preferable. When it is more than 1:50, the apparent density of produced carriers is rapidly decreased or the particle surface becomes rough, which is not preferable.

Titanium halide used in the above-described method for preparing a solid catalyst may be represented by the following General Formula I:

$$Ti(OR)_nX_{(4-n)} \tag{I}$$

Herein, R is an alkyl group having 1 to 10 carbon atoms, X is a halogen element, and n is an integer of 0 to 3 for the atomic valence in General Formula I. Specifically, examples of titanium halide may include $TiCl_4$, $Ti(OCH_3)Cl_3$, $Ti(OC_2H_5)Cl_3$, $Ti(OC_3H_7)Cl_3$, $Ti(O(n-C_4H_9))Cl_3$, $Ti(OCH_3)_2Cl_2$, $Ti(OC_2H_5)_2Cl_2$, $Ti(OC_3H_7)_2Cl_2$, $Ti(O(n-C_4H_9))_2Cl_2$, $Ti(OCH_3)_3Cl$, $Ti(OC_2H_5)_3Cl$, $Ti(OC_3H_7)_3Cl$, and $Ti(O(n-C_4H_9))_3Cl$, etc. Particularly, $TiCl_4$ may be preferably used. Further, these tetravalent titanium halide compounds may be used alone or as a mixture of two or more of them. The reaction temperature in the step (1) is from −10 to 60° C.

A first internal electron donor of the two kinds of internal electron donors used in the step (2) is a compound which may be represented by the following General Formula II:

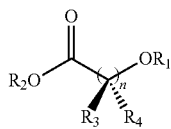

(II)

That is, General Formula II represents alkoxy ester compounds, and n can be 1 to 6 and preferably 2 to 5. Herein, $R_1$, $R_2$, $R_3$, and $R_4$ may be identical or are each independently a linear alkyl group having 1 to 12 carbon atoms, a branched alkyl group having 3 to 12 carbon atoms, a vinyl group, a linear alkenyl group or branched alkenyl group having 3 to 12 carbon atoms, a linear halogen substituted alkyl group having 1 to 12 carbon atoms, a branched halogen substituted alkyl group having 3 to 12 carbon atoms, a linear halogen substituted alkenyl group or branched halogen substituted alkenyl group having 3 to 12 carbon atoms, a cycloalkyl group having 3 to 12 carbon atoms, a cycloalkenyl group having 3 to 12 carbon atoms, a halogen substituted cycloalkyl group having 3 to 12 carbon atoms, and a halogen substituted cycloalkenyl group having 3 to 12 carbon atoms, and more preferably a linear alkyl group having 1 to 12 carbon atoms, a branched alkyl group having 3 to 12 carbon atoms, a vinyl group, a linear alkenyl group or branched alkenyl group having 3 to 12 carbon atoms, a linear halogen substituted alkyl group having 1 to 12 carbon atoms, a branched halogen substituted alkyl group having 3 to 12 carbon atoms, a cycloalkyl group having 3 to 12 carbon atoms, and a cycloalkenyl group having 3 to 12 carbon atoms, and particularly preferably a linear alkyl group having 1 to 12 carbon atoms, a branched alkyl group having 3 to 12 carbon atoms, and a cyclohydrocarbon group having 6 to 12 carbon atoms.

Specifically, examples thereof may include methyl 3-methoxypropanoate, ethyl 3-methoxypropanoate, propyl 3-methoxypropanoate, isopropyl 3-methoxypropanoate, butyl 3-methoxypropanoate, isobutyl 3-methoxypropanoate, t-butyl 3-methoxypropanoate, pentyl 3-methoxypropanoate, isopentyl 3-methoxypropanoate, neopentyl 3-methoxypropanoate, hexyl 3-methoxypropanoate, 2-methylhexyl 3-methoxypropanoate, 2-ethylhexyl 3-methoxypropanoate, heptyl 3-methoxypropanoate, isoheptyl 3-methoxypropanoate, octyl 3-methoxypropanoate, 2-isooctyl 3-methoxypropanoate, cyclopentyl 3-methoxypropanoate, cyclohexyl 3-methoxypropanoate, cycloheptyl 3-methoxypropanoate, cyclopentenyl 3-methoxypropanoate, cyclohexenyl 3-methoxypropanoate, cycloheptenyl 3-methoxypropanoate, methyl 3-ethoxypropanoate, ethyl 3-ethoxypropanoate, propyl 3-ethoxypropanoate, isopropyl 3-ethoxypropanoate, butyl 3-ethoxypropanoate, isobutyl 3-ethoxypropanoate, t-butyl 3-ethoxypropanoate, pentyl 3-ethoxypropanoate, isopentyl 3-ethoxypropanoate, neopentyl 3-ethoxypropanoate, hexyl 3-ethoxypropanoate, 2-methylhexyl 3-ethoxypropanoate, 2-ethylhexyl 3-ethoxypropanoate, heptyl 3-ethoxypropanoate, isoheptyl 3-ethoxypropanoate, octyl 3-ethoxypropanoate, 2-isooctyl 3-ethoxypropanoate, cyclopentyl 3-ethoxypropanoate, cyclohexyl 3-ethoxypropanoate, cycloheptyl 3-ethoxypropanoate, cyclopentenyl 3-ethoxypropanoate, cyclohexenyl 3-ethoxypropanoate, cycloheptenyl 3-ethoxypropanoate, methyl 3-propoxypropanoate, ethyl 3-propoxypropanoate, propyl 3-propoxypropanoate, isopropyl 3-propoxypropanoate, butyl 3-propoxypropanoate, isobutyl 3-propoxypropanoate, t-butyl 3-propoxypropanoate, pentyl 3-propoxypropanoate, isopentyl 3-propoxypropanoate, neopentyl 3-propoxypropanoate, hexyl 3-propoxypropanoate, 2-methylhexyl 3-propoxypropanoate, 2-ethylhexyl 3-propoxypropanoate, heptyl 3-propoxypropanoate, isoheptyl 3-propoxypropanoate, octyl 3-propoxypropanoate, 2-isooctyl 3-propoxypropanoate, cyclopentyl 3-propoxypropanoate, cyclohexyl 3-propoxypropanoate, cycloheptyl 3-propoxypropanoate, cyclopentenyl 3-propoxypropanoate, cyclohexenyl 3-propoxypropanoate, cycloheptenyl 3-propoxypropanoate, methyl 4-methoxybutanoate, ethyl 4-methoxybutanoate, propyl 4-methoxybutanoate, isopropyl 4-methoxybutanoate, butyl 4-methoxybutanoate, isobutyl 4-methoxybutanoate, t-butyl 4-methoxybutanoate, pentyl 4-methoxybutanoate, isopentyl 4-methoxybutanoate, neopentyl 4-methoxybutanoate, hexyl 4-methoxybutanoate, 2-methylhexyl 4-methoxybutanoate, 2-ethylhexyl 4-methoxybutanoate, heptyl 4-methoxybutanoate, isoheptyl 4-methoxybutanoate, octyl 4-methoxybutanoate, 2-isooctyl 4-methoxybutanoate, cyclopentyl 4-methoxybutanoate, cyclohexyl 4-methoxybutanoate, cycloheptyl 4-methoxybutanoate, cyclopentenyl 4-methoxybutanoate, cyclohexenyl 4-methoxybutanoate, cycloheptenyl 4-methoxybutanoate, methyl 4-ethoxybutanoate, ethyl 4-ethoxybutanoate, propyl 4-ethoxybutanoate, isopropyl 4-ethoxybutanoate, butyl 4-ethoxybutanoate, isobutyl 4-ethoxybutanoate, t-butyl 4-ethoxybutanoate, pentyl 4-ethoxybutanoate, isopentyl 4-ethoxybutanoate, neopentyl 4-ethoxybutanoate, hexyl 4-ethoxybutanoate, 2-methylhexyl 4-ethoxybutanoate, 2-ethylhexyl 4-ethoxybutanoate, heptyl 4-ethoxybutanoate, isoheptyl 4-ethoxybutanoate, octyl 4-ethoxybutanoate, 2-isooctyl 4-ethoxybutanoate, cyclopentyl 4-ethoxybutanoate, cyclohexyl 4-ethoxybutanoate, cycloheptyl 4-ethoxybutanoate, cyclopentenyl 4-ethoxybutanoate, cyclohexenyl 4-ethoxybutanoate, cycloheptenyl 4-ethoxybutanoate, methyl 4-propoxybutanoate, ethyl 4-propoxybutanoate, propyl 4-propoxybutanoate, isopropyl 4-propoxybutanoate, butyl 4-propoxybutanoate, isobutyl 4-propoxybutanoate, t-butyl 4-propoxybutanoate, pentyl 4-propoxybutanoate, isopentyl 4-propoxybutanoate, neopentyl 4-propoxybutanoate, hexyl 4-propoxybutanoate, 2-methylhexyl 4-propoxybutanoate, 2-ethylhexyl 4-propoxybutanoate, heptyl 4-propoxybutanoate, isoheptyl 4-propoxybutanoate, octyl 4-propoxybutanoate, 2-isooctyl 4-propoxybutanoate, cyclopentyl 4-propoxybutanoate, cyclohexyl 4-propoxybutanoate, cycloheptyl 4-propoxybutanoate, cyclopentenyl 4-propoxybutanoate, cyclohexenyl 4-propoxybutanoate, cycloheptenyl 4-propoxybutanoate, methyl 5-methoxypentanoate, ethyl 5-methoxypentanoate, propyl 5-methoxypentanoate, isopropyl 5-methoxypentanoate, butyl 5-methoxypentanoate, isobutyl 5-methoxypentanoate, t-butyl 5-methoxypentanoate, pentyl 5-methoxypentanoate, isopentyl 5-methoxypentanoate, neopentyl 5-methoxypentanoate, hexyl 5-methoxypentanoate, 2-methylhexyl 5-methoxypentanoate, 2-ethylhexyl 5-methoxypentanoate, heptyl 5-methoxypentanoate, isoheptyl 5-methoxypentanoate, octyl 5-methoxypentanoate, 2-isooctyl 5-methoxypentanoate, cyclopentyl 5-methoxypentanoate, cyclohexyl 5-methoxypentanoate, cycloheptyl 5-methoxypentanoate, cyclopentenyl 5-methoxypentanoate, cyclohexenyl 5-methoxypentanoate, cycloheptenyl 5-methoxypentanoate, methyl 5-ethoxypentanoate, ethyl 5-ethoxypentanoate, propyl 5-ethoxypentanoate, isopropyl 5-ethoxypentanoate, butyl 5-ethoxypentanoate, isobutyl 5-ethoxypentanoate, t-butyl 5-ethoxypentanoate, pentyl 5-ethoxypentanoate, isopentyl 5-ethoxypentanoate, neopentyl 5-ethoxypentanoate, hexyl 5-ethoxypentanoate, 2-methylhexyl 5-ethoxypentanoate, 2-ethylhexyl 5-ethoxypentanoate, heptyl 5-ethoxypentanoate, isoheptyl 5-ethoxypentanoate, octyl 5-ethoxypentanoate, 2-isooctyl 5-ethoxypentanoate, cyclopentyl 5-ethoxypentanoate, cyclohexyl 5-ethoxypentanoate, cycloheptyl 5-ethoxypentanoate, cyclopentenyl 5-ethoxypentanoate, cyclohexenyl 5-ethoxypentanoate, cycloheptenyl 5-ethoxypentanoate, methyl 5-propoxypentanoate, ethyl 5-propoxypentanoate, propyl 5-propoxypentanoate, isopropyl 5-propoxypentanoate, butyl 5-propoxypentanoate, isobutyl 5-propoxypentanoate, t-butyl 5-propoxypentanoate, pentyl 5-propoxypentanoate, isopentyl 5-propoxypentanoate, neopentyl 5-propoxypentanoate, hexyl 5-propoxypentanoate, 2-methylhexyl 5-propoxypentanoate, 2-ethylhexyl 5-propoxypentanoate, heptyl 5-propoxypentanoate, isoheptyl 5-propoxypentanoate, octyl 5-propoxypentanoate, 2-isooctyl 5-propoxypentanoate, cyclopentyl 5-propoxypentanoate, cyclohexyl 5-propoxypentanoate, cycloheptyl 5-propoxypentanoate, cyclopentenyl 5-propoxypentanoate, cyclohexenyl 5-propoxypentanoate, cycloheptenyl 5-propoxypentanoate, methyl 6-methoxyhexanoate, ethyl 6-methoxyhexanoate, propyl 6-methoxyhexanoate, isopropyl 6-methoxyhexanoate, butyl 6-methoxyhexanoate, isobutyl 6-methoxyhexanoate, t-butyl 6-methoxyhexanoate, pentyl 6-methoxyhexanoate, isopentyl 6-methoxyhexanoate, neopentyl 6-methoxyhexanoate, hexyl 6-methoxyhexanoate, 2-methylhexyl 6-methoxyhexanoate, 2-ethylhexyl 6-methoxyhexanoate, heptyl 6-methoxyhexanoate, isoheptyl 6-methoxyhexanoate, octyl 6-methoxyhexanoate, 2-isooctyl 6-methoxyhexanoate, cyclopentyl 6-methoxyhexanoate, cyclohexyl 6-methoxyhexanoate, cycloheptyl 6-methoxyhexanoate, cyclopentenyl 6-methoxyhexanoate, cyclohexenyl 6-methoxyhexanoate, cycloheptenyl 6-methoxyhexanoate, methyl 6-ethoxyhexanoate, ethyl 6-ethoxyhexanoate, propyl 6-ethoxyhexanoate, isopropyl 6-ethoxyhexanoate, butyl 6-ethoxyhexanoate, isobutyl 6-ethoxyhexanoate, t-butyl 6-ethoxyhexanoate, pentyl 6-ethoxyhexanoate, isopentyl 6-ethoxyhexanoate, neopentyl 6-ethoxyhexanoate, hexyl 6-ethoxyhexanoate, 2-methylhexyl 6-ethoxyhexanoate, 2-ethylhexyl 6-ethoxyhexanoate, heptyl 6-ethoxyhexanoate, isoheptyl 6-ethoxyhexanoate, octyl 6-ethoxyhexanoate, 2-isooctyl 6-ethoxyhexanoate, cyclopentyl 6-ethoxyhexanoate, cyclohexyl 6-ethoxyhexanoate, cycloheptyl 6-ethoxyhexanoate, cyclopentenyl 6-ethoxyhexanoate, cyclohexenyl 6-ethoxyhexanoate, cycloheptenyl 6-ethoxyhexanoate, methyl 6-propoxyhexanoate, ethyl 6-propoxyhexanoate, propyl 6-propoxyhexanoate, isopropyl 6-propoxyhexanoate, butyl 6-propoxyhexanoate, isobutyl 6-propoxyhexanoate, t-butyl 6-propoxyhexanoate, pentyl 6-propoxyhexanoate, isopentyl 6-propoxyhexanoate, neopentyl 6-propoxyhexanoate, hexyl 6-propoxyhexanoate, 2-methylhexyl 6-propoxyhexanoate, 2-ethylhexyl 6-propoxyhexanoate, heptyl 6-propoxyhexanoate, isoheptyl 6-propoxyhexanoate, octyl 6-propoxyhexanoate, 2-isooctyl 6-propoxyhexanoate, cyclopentyl 6-propoxyhexanoate, cyclohexyl 6-propoxyhexanoate, cycloheptyl 6-propoxyhexanoate, cyclopentenyl 6-propoxyhexanoate, cyclohexenyl 6-propoxyhexanoate, or cycloheptenyl 6-propoxyhexanoate, etc.

Meanwhile, a second internal electron donor of the two kinds of internal electron donors used in the step (2) is not particularly limited, and may employ any compound, such as alcohols, ethers, ketones, and carboxylic acids, which can be used as an internal electron donor when preparing a Ziegler-based catalyst for olefin polymerization. Particularly, as the second internal electron donor, it is preferable to use a carboxylic acid compound which is a phthalic acid ester compound and more preferable to use one or a mixture of two or more selected from benzene-1,2-dicarboxylic acid ester compounds. Specifically, examples of the benzene-1, 2-dicarboxylic acid ester compounds may include dimethylphthalate, diethylphthalate, dinormalpropylphthalate, diisopropylphthalate, dinormalbutylphthalate, diisobutylphthalate dinormalpentylphthalate, di(2-methylbutyl)phthalate, di(3-methylbutyl)phthalate, di(3-methylpentyl)phthalate, diisohexylphthalate, dineohexylphthalate, di(2,3-dimethylbutyl)phthalate, diisohexylphthalate, dineohexylphthalate, di(2,3-dimethylbutyl)phthalate, dinormalheptylphthalate, di(2-methylhexyl)phthalate, di(2-ethylpentyl)phthalate, diisoheptylphthalate, dineoheptylphthalate, dinormaloctylphthalate, di(2-methylheptyl)phthalate, diisooctylphthalate, di(3-ethylhexyl)phthalate, dineooctylphthalate, dinormalnonylphthalate, diisononylphthalate, dinormaldecylphthalate, and diisodecylphthalate, etc.

The step (2) is preferably carried out by adding an internal electron donor while gradually increasing the temperature of the resultant of the step (1) to the range of 60 to 150° C., preferably 80 to 130° C. and allowing them to react for 1 to 3 hours. When the temperature is less than 60° C. or the reaction time is less than 1 hour, the reaction can be hardly completed. When the temperature is more than 150° C. or the reaction time is more than 3 hours, a side-reaction may occur and lower the polymerization activity or stereoregularity of the resultant catalyst.

The first and second internal electron donors are not limited in temperature or number of times of addition as long as they are added during the temperature increase process. Two or more different kinds of internal electron donors may be added at the same time or at different temperatures. The total amount of the two internal electron donors used is not limited. However, as for the total molar amount of the two internal electron donors used, the molar amount of the first internal electron donor is preferably 0.001 to 2.0 moles and the molar amount of the second internal electron donor is preferably 0.001 to 2.0 moles based on 1 mole of dialkoxy magnesium. When the molar amount is out of the above-described range, the polymerization activity or stereoregularity of the produced catalyst may be decreased, which is not preferable.

In the above-described method for preparing a solid catalyst, the steps (3) and (4) are processes for reacting the product of the step (2) with titanium halide two or more times at a temperature of 60 to 150° C. and preferably 80 to 130° C. An example of the titanium halide used herein may include titanium halide represented by General Formula I.

In the above-described method for preparing a solid catalyst, the reactions at each step are preferably carried out in a reactor equipped with a stirrer from which moisture was sufficiently removed, under nitrogen atmosphere.

The solid catalyst prepared by the above method of the present disclosure is formed by including magnesium, titanium, halogen, and an internal electron donor, and preferably including magnesium in the amount of 5 to 40 wt %, titanium in the amount of 0.5 to 10 wt %, halogen in the amount of 50 to 85 wt %, a first internal electron donor in the amount of 0.1 to 20 wt %, and a second internal electron donor in the amount of 0.1 to 20 wt % in terms of the catalytic activity.

The solid catalyst prepared by the method for preparing a catalyst of the present disclosure may be suitably used in propylene polymerization or copolymerization, and the propylene polymerization or copolymerization method using the solid catalyst prepared according to the present disclosure includes polymerization of propylene or copolymerization of propylene with other α-olefins in the presence of the solid catalyst, a co-catalyst, and an external electron donor.

The α-olefin used in the copolymerization of the present disclosure may include at least one selected from α-olefins having 2 to 20 carbon atoms (except propylene having 3 carbon atoms). Specifically, ethylene, 1-butene, 1-pentene, 4-methyl-1-pentene, vinylcyclohexane, and the like can be used. Further, one or two or more kinds of α-olefins can be used. Particularly, ethylene and 1-butene are suitable, and ethylene is more preferable.

The solid catalyst may be pre-polymerized with ethylene or α-olefin before being used as a component of a polymerization reaction.

The pre-polymerization reaction may be carried out at a sufficiently low temperature under the pressure of ethylene or α-olefin, in the presence of a hydrocarbon solvent (for example, hexane), the above-described catalyst component and an organic aluminum compound (for example, triethyl aluminum). The pre-polymerization enables catalyst particles to be surrounded by polymers so as to maintain the catalyst shape and thus helps improve the polymer morphology after polymerization. The weight ratio of polymers/catalyst after the completion of pre-polymerization is preferably about 0.1 to 20:1.

As a co-catalyst component used in the propylene polymerization or copolymerization, organic metal compounds belonging to Group II or III in the periodic table may be used. For example, alkyl aluminum compounds are preferably used. The alkyl aluminum compounds may be represented by the following General Formula III:

$$AlR_3 \quad (III)$$

Herein, R is an alkyl group having 1 to 6 carbon atoms.

Specific examples of the alkyl aluminum compounds may include trimethyl aluminum, triethyl aluminum, tripropyl aluminum, tributyl aluminum, triisobutyl aluminum, and trioctyl aluminum.

The ratio of the co-catalyst to the solid catalyst component may vary depending on a polymerization method. However, the molar ratio of metal atoms in the co-catalyst to titanium atoms in the solid catalyst component is preferably in the range of 1 to 1000 and more preferably 10 to 300. When the molar ratio of metal atoms, for example, aluminum atoms, in the co-catalyst to titanium atoms in the solid catalyst component is out of the range of 1 to 1000, the polymerization activity is greatly decreased.

In the propylene polymerization or copolymerization, as the external electron donor, one or a mixture of two or more of alkoxy silane compounds represented by the following General Formula IV may be used:

$$R^1{}_m R^2{}_n Si(OR^3)_{(4-m-n)} \quad (IV)$$

Herein, $R^1$ and $R^2$ may be identical or different and are each independently a linear or branched or cyclic alkyl or aryl group having 1 to 12 carbon atoms; $R^3$ is a linear or branched alkyl group having 1 to 6 carbon atoms; m and n are individually 0 or 1; and m+n is 1 or 2.

Specific examples of the external electron donor may include normalpropyltrimethoxysilane, dinormalpropyldimethoxysilane, isopropyltrimethoxysilane, diisopropyldimethoxysilane, normalbutyltrimethoxysilane, dinormalbutyldimethoxysilane, isobutyltrimethoxysilane, diisobutyldimethoxysilane, tertiarybutyltrimethoxysilane, ditertiarybutyldimethoxysilane, normalpentyltrimethoxysilane, dinormalpentyldimethoxysilane, cyclopentyltrimethoxysilane, dicyclopentyldimethoxysilane, cyclopentylmethyldimethoxysilane, cyclopentylethyldimethoxysilane, cyclopentylpropyldimethoxysilane, cyclohexyltrimethoxysilane, dicyclohexyldimethoxysilane, cyclohexylmethyldimethoxysilane, cyclohexylethyldimethoxysilane, cyclohexylpropyldimethoxysilane, cycloheptyltrimethoxysilane, dicycloheptyldimethoxysilane, cycloheptylmethyldimethoxysilane, cycloheptylethyldimethoxysilane, cycloheptylpropyldimethoxysilane, phenyltrimethoxysilane, diphenyldimethoxysilane, phenylmethyldimethoxysilane, phenylethyldimethoxysilane, phenylpropyldimethoxysilane, normalpropyltriethoxysilane, dinormalpropyldiethoxysilane, isopropyltriethoxysilane, diisopropyldiethoxysilane, normalbutyltriethoxysilane, dinormalbutyldiethoxysilane, isobutyltriethoxysilane, diisobutyldiethoxysilane, tertiarybutyltriethoxysilane, ditertiarybutyldiethoxysilane, normalpentyltriethoxysilane, dinormalpentyldiethoxysilane, cyclopentyltriethoxysilane, dicyclopentyldiethoxysilane, cyclopentylmethyldiethoxysilane, cyclopentylethyldiethoxysilane, cyclopentylpropyldiethoxysilane, cyclohexyltriethoxysilane, dicyclohexyldiethoxysilane, cyclohexylmethyldiethoxysilane, cyclohexylethyldiethoxysilane, cyclohexylpropyldiethoxysilane, cycloheptyltriethoxysilane, dicycloheptyldiethoxysilane, cycloheptylmethyldiethoxysilane, cycloheptylethyldiethoxysilane, cycloheptylpropyldiethoxysilane, phenyltriethoxysilane, diphenyldiethoxysilane, phenylmethyldiethoxysilane, phenylethyldiethoxysilane, and phenylpropyldiethoxysilane. These compounds may be used alone or as a mixture of two or more of them as the external electron donor.

The amount of external electron donor used with respect to the solid catalyst may vary depending on a polymerization method. However, the molar ratio of silicon atoms in the external electron donor based on titanium atoms in the catalyst component is preferably in the range of 0.1 to 500 and more preferably 1 to 100. When the molar ratio of silicon atoms in the external electron donor to titanium atoms in the solid catalyst component is less than 0.1, the stereoregularity of the produced propylene polymer is significantly decreased, which is not preferable. When it is more than 500, the polymerization activity of the catalyst is significantly decreased.

During the propylene polymerization or copolymerization, the polymerization temperature is preferably 20 to 120° C. When the polymerization temperature is less than 20° C., the polymerization reaction cannot sufficiently proceed, which is not preferable. When it is more than 120° C., the activity is considerably decreased and the physical properties of the produced polymer are degraded, which is not preferable.

The present disclosure relates to a method for preparing a solid catalyst for manufacture of polypropylene and provides a method for preparing a solid catalyst including carriers produced via a reaction between dialkoxy magnesium and metal halide, titanium halide, an organic electron donor, etc. and a process of manufacture of polypropylene using the same. Particularly, internal electron donors including an ester group and an alkoxy group are used as two kinds of organic electron donors used in the present disclosure. The present disclosure can be applied to various propylene polymerization processes such as slurry polymerization, bulk polymerization, or gas-phase polymerization, and can produce a block copolymer having high activity and excellent stereoregularity and a high rubber content via copolymerization with α-olefin.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DETAILED DESCRIPTION

Example embodiments will now be described more fully.

The illustrative embodiments described in the detailed description and claims are not meant to be limiting. Other embodiments may be utilized, and other changes may be made, without departing from the spirit or scope of the subject matter presented here.

Hereinafter, Examples of the present disclosure and Comparative Examples will be described in detail, but the present disclosure is not limited thereto.

EXAMPLES

Example 1

1. Preparation of Solid Catalyst

To an 1 L-volume glass reactor of which atmosphere was sufficiently substituted by nitrogen, equipped with a stirrer, 112 ml of toluene and 15 g of spherical-shaped diethoxy magnesium (having an average particle diameter of 20 μm, particle distribution index of 0.86, apparent density of 0.35 g/cc) were added, and then 20 ml of titanium tetrachloride diluted in 30 ml of toluene was further added thereto and allowed to react for 1 hour while maintaining the temperature at 10° C. Then, a mixture of 3.6 g of diisobutylphthalate and 1.4 g of methyl 4-methoxybutanoate was added thereto while increasing the reactor temperature to 100° C. After maintaining the temperature at 100° C. for 2 hours and then lowering it to 90° C., stirring was halted, a supernatant was removed, and the resultant product was washed once with additional 200 ml of toluene. Then, 120 ml of toluene and 20 ml of titanium tetrachloride were added thereto, and the temperature was raised to 100° C. and maintained for 2 hours, and this process was repeated once. After the completion of the aging process, the slurry mixture was washed twice with 200 ml of toluene per washing, and then washed 5 times at 40° C. with 200 ml of normal hexane per washing, thereby obtaining a pale yellow solid catalyst component. The obtained solid catalyst component was dried for 18 hours under a nitrogen stream, and the titanium content in the obtained solid catalyst component was 2.2 wt %.

2. Polypropylene Polymerization

Into a 4 L-volume high-pressure stainless reactor, 10 mg of the obtained solid catalyst, 10 mmol of triethyl aluminum, and 1 mmol of dicyclopentylmethyldimethoxysilane were added. Then, 3000 ml of hydrogen and 2.4 L of liquid propylene were added in sequence and polymerization was carried out at an elevated temperature of 70° C. After 2 hours from the start of polymerization, the remaining propylene inside the reactor was completely removed by opening the valve while lowering the reactor temperature to room temperature.

The polymer thus obtained was analyzed, and the result of the analysis is given in Table 1.

Herein, the catalytic activity and stereoregularity were determined by the following method.

① Catalytic activity(kg-PP/g-cat)=the amount of polymer produced (kg)÷the amount of catalyst (g)

② Stereoregularity (X.I.): the amount of insolubles crystallized and precipitated in mixed xylene (wt %)

③ Melt-flowability (g/10 min): a value measured with ASTM1238 at 230° C. under a load of 2.16 kg 3. Propylene-Based Block Copolymerization Into a 2.0 L-stainless reactor filled with nitrogen and equipped with a stirrer, 5 mg of the solid catalyst, 3 mmol of triethyl aluminum, and 0.3 mmol of dicyclopentyldimethoxysilane (DCPDMS) were added. Then, 1.2 L of liquid propylene and 3000 ml of hydrogen were added thereto and pre-polymerization was carried out at 20° C. for 5 minutes and homopropylene polymerization was carried out at 70° C. for 40 minutes. After the completion of homopolymerization, a monomer was purged while lowering the reactor temperature to room temperature. Then, a mixed gas in which the molar ratio of ethylene/(ethylene+propylene) is 0.4 was added into the reactor and polymerization was carried out at an elevated temperature of 70° C. for 60 minutes. Thus, a propylene-based block copolymer was obtained.

① Block copolymer activity (ICP activity, kg-PP/g-cat) =the amount of polymer produced (kg)÷the amount of catalyst (g)

② Ethylene propylene rubber content (EPR, wt %): the amount of precipitates after sampling a copolymer with xylene and removing xylene (wt %)

③ Ethylene content in copolymer (B-C2): the amount of ethylene measured with an infrared spectrometer (FT-IR) from a sampled copolymer (calculated on the basis of a calibration curve derived from a standard sample)

④ Ethylene content in EPR (PER-C2, wt %): (ethylene content in copolymer)/(ethylene propylene rubber content)×100

Example 2

A catalyst was prepared according to the method for preparation of a solid catalyst in Example 1-1 except that 3.3 g of diisobutylphthalate and 2.1 g of ethyl 4-ethoxybutanoate were added instead of a mixture of diisobutylphthalate and methyl 4-methoxybutanoate. The titanium content in the solid catalyst component was 2.1 wt %. Then, polypropylene polymerization and propylene-based copolymerization were carried out by the same method as in Example 1, and the results thereof are given in Table 1.

Example 3

A catalyst was prepared according to the method for preparation of a solid catalyst in Example 1-1 except that a mixture of 4.2 g of diisobutylphthalate and 2.8 g of methyl 5-methoxypentanoate was used instead of a mixture of diisobutylphthalate and methyl 4-methoxybutanoate. The titanium content in the solid catalyst component was 2.3 wt %. Then, polypropylene polymerization and propylene-based copolymerization were carried out by the same method as in Example 1, and the results thereof are given in Table 1.

Example 4

A catalyst was prepared according to the method for preparation of a solid catalyst in Example 1-1 except that 4.5 g of diisobutylphthalate was added and then 1.8 g of ethyl 5-ethoxypentanoate was added instead of a mixture of diisobutylphthalate and methyl 4-methoxybutanoate while increasing the temperature. The titanium content in the solid catalyst component was 2.0 wt %. Then, polypropylene polymerization and propylene-based copolymerization were carried out by the same method as in Example 1, and the results thereof are given in Table 1.

Example 5

A catalyst was prepared according to the method for preparation of a solid catalyst in Example 4 except that 3 g of diisobutylphthalate and 1.2 g of methyl 5-ethoxypentanoate were separately added instead of a mixture of diisobutylphthalate and ethyl 5-ethoxypentanoate. The titanium content in the solid catalyst component was 2.3 wt %. Then, polypropylene polymerization was carried out by the same method as in Example 1, and the results thereof are given in Table 1.

Comparative Example 1

A catalyst was prepared according to the method for preparation of a solid catalyst in Example 1-1 except that 4.7 g of diisobutylphthalate was used instead of a mixture of diisobutylphthalate and 2-ethoxyethyl butyrate. The titanium content in the solid catalyst component was 2.2 wt %. Then, polypropylene polymerization was carried out by the same method as in Example 1, and the result thereof is given in Table 1.

Comparative Example 2

1. Preparation of Solid Catalyst

To an 1 L-volume glass reactor of which atmosphere was sufficiently substituted by nitrogen, equipped with a stirrer, 150 ml of toluene, 12 ml of tetrahydrofuran, 20 ml of butanol, and 21 g of magnesium chloride were added, and the temperature was raised to 110° C. and maintained for 1 hour, thereby obtaining a homogenous solution. The solution was cooled to 15° C. and then added with 25 ml of titanium tetrachloride, and then, the reactor temperature was raised to 60° C. over 1 hour. After aging for 10 minutes, the mixture was stood still for 15 minutes to precipitate the carriers, and a supernatant was removed. The slurry remained in the reactor was added with 200 ml of toluene, and stirring, standing still, and removal of the supernatant was repeated twice for washing.

The obtained slurry was added with 150 ml of toluene and then, 25 ml of titanium tetrachloride diluted in 50 ml of toluene was further added at 15° C. over 1 hour. Then, the reactor temperature was raised to 30° C. at a speed of 0.5° C. per minute. The reaction mixture was maintained at 30° C. for 1 hour and then, 7.5 ml of diisobutylphthalate was added thereto. Then, its temperature was raised to 110° C. at a speed of 0.5° C. per minute.

After maintaining the temperature at 110° C. for 1 hour, the temperature was lowered to 90° C. and stirring was halted. Further, the supernatant was removed and the resultant product was washed once with additional 200 ml of toluene in the same way. Then, 150 ml of toluene and 50 ml of titanium tetrachloride were added thereto and the temperature was raised to 110° C. and maintained for 1 hour. After the completion of the aging process, the slurry mixture was washed twice with 200 ml of toluene per washing, and then washed 5 times at 40° C. with 200 ml of hexane per washing, thereby obtaining a pale yellow solid catalyst component. The obtained catalyst component was dried for 18 hours under a nitrogen stream, and the titanium content in the obtained solid catalyst component was 3.3 wt %.

TABLE 1

| | HOMO polymerization | | | Propylene-based copolymerization | | | |
|---|---|---|---|---|---|---|---|
| | Activity | | | | | | |
| | (g-PP/g cat 2 h) | X/S (wt %) | MI (g/10 min) | ICP activity (g-PP/g cat) | EPR (wt %) | B-C2 (wt %) | PER-C2 (wt %) |
| Example 1 | 72,000 | 0.6 | 5.3 | 56,000 | 33 | 17 | 52 |
| Example 2 | 75,000 | 0.5 | 4.8 | 58,000 | 35 | 18 | 51 |
| Example 3 | 86,000 | 0.6 | 6.8 | 53,000 | 32 | 17 | 53 |
| Example 4 | 83,000 | 0.5 | 5.4 | 55,000 | 30 | 16 | 53 |
| Example 5 | 90,000 | 0.4 | 6.1 | 52,000 | 30 | 16 | 53 |
| Comparative Example 1 | 83,000 | 1.5 | 6.7 | 48,000 | 23 | 12 | 52 |
| Comparative Example 2 | 66,000 | 1.9 | 7.8 | 41,000 | 29 | 14 | 48 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A solid catalyst for propylene polymerization, comprising:
    a titanium halide compound;
    a magnesium compound; and
    an internal electron donor including a mixture of a non-aromatic alkoxy ester compound represented by the following General Formula II and phthalic acid ester:

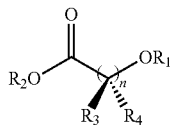

(II)

wherein n is 3 to 5; $R_1$ is a linear alkyl group having 1 to 8 carbon atoms, a branched alkyl group having 4, 5, or 7 carbon atoms, a cycloalkyl group having 5 to 7 carbon atoms, or a cycloalkenyl group having 5 to 7 carbon atoms; $R_2$ is a linear alkyl group having 1 to 3 carbon atoms; and $R_3$ and $R_4$ are each hydrogen.

2. The solid catalyst for propylene polymerization of claim 1, wherein the solid catalyst includes the magnesium compound in the amount of 5 to 40 wt %, the titanium halide compound in the amount of 0.5 to 10 wt %, a halogen in the amount of 50 to 85 wt %, and internal electron donors in the total amount of 0.2 to 40 wt %.

3. The solid catalyst for propylene polymerization of claim 1, wherein the solid catalyst includes an alkoxy ester internal electron donor in the amount of 0.01 to 20 wt %.

4. The solid catalyst for propylene polymerization of claim 1, wherein two kinds of internal electron donors used in the solid catalyst include alkoxy ester and phthalic acid ester.

5. A process for manufacture of a propylene polymer or copolymer, comprising:
    polymerization of propylene or copolymerization of propylene with other α-olefins in the presence of a solid catalyst of claim 1, $AlR_3$, wherein R is an alkyl group having 1 to 6 carbon atoms, as a co-catalyst, and $R^1{}_m R^2{}_n Si(OR^3)_{(4-m-n)}$, wherein $R^1$ and $R^2$ are identical or different and are each independently a linear or branched or cyclic alkyl or aryl group having 1 to 12 carbon atoms, $R^3$ is a linear or branched alkyl group having 1 to 6 carbon atoms, m and n are individually 0 or 1, and m+n is 1 or 2, as an external electron donor.

6. A process for manufacture of a propylene polymer or copolymer, comprising:
    copolymerization of propylene and ethylene or propylene and α-olefin after homopolymerization of propylene or copolymerization of propylene and ethylene in the presence of a solid catalyst of claim 1.

7. A process for manufacture of a propylene polymer or copolymer, comprising:
    polymerization of propylene or copolymerization of propylene with other α-olefins in the presence of a solid catalyst of claim 2, $AlR_3$, wherein R is an alkyl group having 1 to 6 carbon atoms, as a co-catalyst, and $R^1{}_m R^2{}_n Si(OR^3)_{(4-m-n)}$, wherein $R^1$ and $R^2$ are identical or different and are each independently a linear or branched or cyclic alkyl or aryl group having 1 to 12 carbon atoms, $R^3$ is a linear or branched alkyl group having 1 to 6 carbon atoms, m and n are individually 0 or 1, and m+n is 1 or 2, as an external electron donor.

8. A process for manufacture of a propylene polymer or copolymer, comprising:
    copolymerization of propylene and ethylene or propylene and α-olefin after homopolymerization of propylene or copolymerization of propylene and ethylene in the presence of a solid catalyst of claim 4.

* * * * *